(12) United States Patent
Simon

(10) Patent No.: US 6,404,157 B1
(45) Date of Patent: Jun. 11, 2002

(54) CIRCUITRY USING BACK EMF OF A MOTOR TO GENERATE A SYSTEM WAKE UP SIGNAL

(76) Inventor: John D. Simon, 375 Shortridge Ave., Rochester Hills, MI (US) 48307

( * ) Notice: Subject to any disclaimer, the term of this patent is extended or adjusted under 35 U.S.C. 154(b) by 0 days.

(21) Appl. No.: 09/626,996

(22) Filed: Jul. 27, 2000

(51) Int. Cl.[7] .................................................. H02P 3/00
(52) U.S. Cl. ...................... 318/445; 318/432; 318/453; 318/466; 318/264; 318/286
(58) Field of Search .................................. 318/430, 432, 318/443, 445, 447, 449–450, 452–455, 484, 466–470, 264–267, 286

(56) References Cited

U.S. PATENT DOCUMENTS

| | | | | |
|---|---|---|---|---|
| 4,529,920 A | * | 7/1985 | Yoshida et al. | 318/466 |
| 5,793,174 A | * | 8/1998 | Kovach et al. | 318/468 |
| 5,869,940 A | * | 2/1999 | Prsadayan | 318/466 |
| 6,081,091 A | * | 6/2000 | Mitchell et al. | 318/430 |
| 6,184,645 B1 | * | 2/2001 | Brito et al. | 318/430 |

* cited by examiner

Primary Examiner—Marlon T. Fletcher
(74) Attorney, Agent, or Firm—Jimmy L. Funke

(57) ABSTRACT

A wakeup signal generating circuit is connected to an input of an electrically driven motor having a drive shaft that is mechanically coupled to a power sliding door or power lift gate of an automobile. The motor is normally responsive to a motor drive signal to control door/lift gate movement via rotation of the motor drive shaft. In the absence of the motor drive signal, the motor is responsive to rotation of the drive shaft, via manual movement of the door or lift gate, to produce a back electromotive force (EMF) signal at the input of the motor. The wakeup signal generating circuit is responsive to the back EMF signal to produce a wakeup signal. In one embodiment, the wakeup signal is used to cause a control circuit controlling the overall operation of the motor to wake up from a reduced-function, power conserving sleep mode of operation and operate in a full-function, full power wakeup mode of operation.

18 Claims, 2 Drawing Sheets

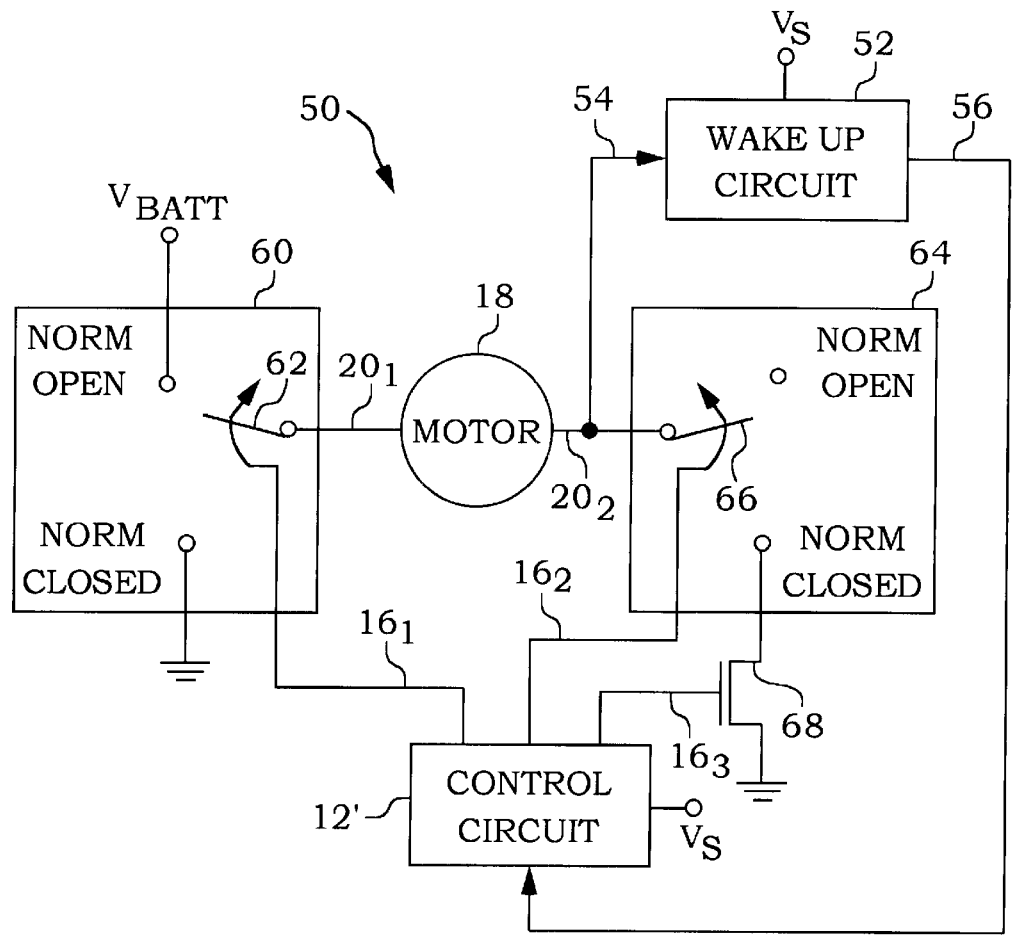
FIG. 3
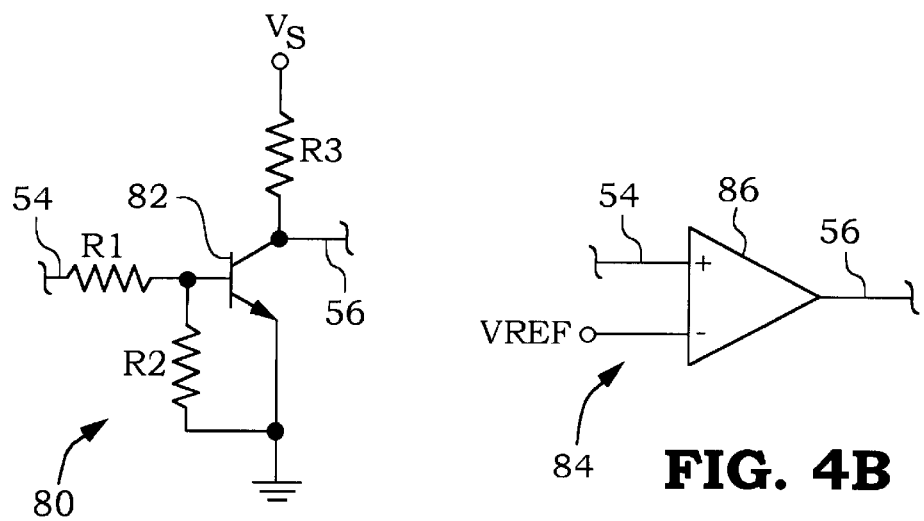
FIG. 4A  FIG. 4B

CIRCUITRY USING BACK EMF OF A MOTOR TO GENERATE A SYSTEM WAKE UP SIGNAL

TECHNICAL FIELD

The present invention relates generally to techniques for reducing power consumption in a motor driven system, and more specifically to circuitry for generating a system wake up signal as a function of manual motor actuation in a motor driven system having a power conserving sleep function.

BACKGROUND OF THE INVENTION

Passenger vehicles are typically equipped with a rear vehicle compartment for storing a spare tire and/or for transporting items such as groceries, luggage, tools, and the like. Some such vehicles, commonly known as sport utility vehicles, include a hatch or lift gate for accessing such a compartment. Passenger vans, on the other hand, typically include one or more sliding doors for accessing a rear passenger and/or storage compartment.

In vehicles of the foregoing type, control systems are known and currently available for automatically opening and/or closing lift gates and sliding doors. So-called "power lift gate" and "power sliding door" systems may be physically or remotely actuated whereby a dedicated control circuit is operable to control one or electrically driven motors to drive the lift gate or door to either an open or closed position. Referring to FIG. 1, an example of one known motor control system 10 of the foregoing type is shown. System 10 includes a control circuit 12, such as a known microprocessor-based control unit, electrically connected to a motor actuation circuit 14 via a number, N, of signal paths 16, wherein N may be any positive integer. The motor actuation circuit 14 is of known construction and is electrically connected to an electrical motor 18 via a number, M, of signal paths 20, wherein M may be any positive integer. Motor 18 is typically a direct drive motor and includes a motor drive shaft L that is connected to an automotive door or lift gate 22 either directly or via mechanical linkage. A motor position determining circuit 24 of known construction is typically electrically connected to motor 18, or alternatively to motor actuator circuit 14, via a number, J, of signal paths 26, wherein J may be any positive integer. The motor position detection circuit is electrically connected to control circuit 12 via a number, K, of signal paths 28, wherein K may be any integer.

In operation, control circuit is operable to produce one or more motor control signals on signal paths 16, wherein motor actuation circuit 14 is responsive to the one or more motor control signals to produce one or more motor drive signals on signal paths 20. The motor 18 is, in turn, responsive to the one or more motor drive signals to correspondingly rotate its drive shaft L and thereby automatically drive movement of the door or lift gate 22. The control circuit 12 is typically operable to track the position of the door or lift gate 22 via one or more signals produced by the motor position circuit 24.

Currently, known power lift gate and power sliding door systems of the foregoing type operate in a stand-by mode of operation wherein electrical power is constantly applied to the system. This arrangement ensures that such systems are readily operable and that the control circuit may therefore instantaneously control the present gate/door position. However, such systems have a drawback in that electrical power is needlessly consumed thereby. It would accordingly be advantageous in such systems to provide for "sleep" and "wake-up" modes of operation, wherein the system enters a low power consumption sleep mode after expiration of some predefined time period following gate/door actuation, and wherein the system wakes up to a full power operational mode upon manual gate/door actuation. Presently, however, no such systems are known that include the ability to wake up from sleep mode in response to manual gate/door actuation.

What is therefore needed is an improved power door/lift gate system operable in sleep and wake-up operational modes, wherein such a system includes a reliable mechanism for waking up from sleep mode operation in response to manual door/lift gate movement.

SUMMARY OF THE INVENTION

The foregoing shortcomings of the prior art are addressed by the present invention. In accordance with one aspect of the present invention, circuitry for producing a wakeup signal based on back electromotive force (EMF) of a motor comprises a motor having a drive shaft and at least one input for receiving a motor drive signal, wherein the motor is responsive to the motor drive signal to rotate the drive shaft, wherein the motor produces a back EMF signal at the at least one input in the absence of the motor drive signal and in response to rotational movement of the drive shaft, and a wakeup circuit having an input connected to the at least one input of the motor and an output, wherein the wakeup circuit is responsive to the back EMF signal at the input thereof to produce a wakeup signal at the output thereof.

In accordance with another aspect of the present invention, a method for producing a wakeup signal in a motor control system based on back electromotive force (EMF) of an electrically driven motor comprises the steps of monitoring an electrical input of a motor having a drive shaft, wherein the motor is responsive to a motor drive signal to rotate the drive shaft, and wherein the motor produces a back EMF signal in response to movement of the drive shaft in the absence of the motor drive signal, and producing a wakeup signal is response to detection of the back EMF signal.

One object of the present invention is to provide an electrical circuit for producing a wakeup signal as a function of back electromotive force (EMF) of a motor.

Another object of the present invention is to utilize such a circuit in an electrical motor control system operable to drive a power sliding door or power lift gate assembly in an automotive environment.

Another object of the present invention is to utilize such a circuit in such an electrical motor control system that is operable in a reduced-function, reduced-power consumption sleep mode of operation and in a full-function, full-power consumption wakeup mode of operation, for waking up the system from sleep mode in response to manual actuation of the door or lift gate.

These and other objects of the present invention will become more apparent from the following description of the preferred embodiments.

BRIEF DESCRIPTION OF THE DRAWINGS

The present invention will now be described, by way of example, with reference to the accompanying drawings, in which:

FIG. 3 is a diagrammatic illustration of one preferred embodiment of an interface between the motor, motor actuation circuit and wake up circuit of FIG. 2, in accordance with the present invention;

FIG. 4A is a schematic diagram illustrating one preferred embodiment of the wake up circuit of FIGS. 2 and 3, in accordance with the present invention; and FIG. 4B is a schematic diagram illustrating an alternate embodiment of the wake up circuit of FIGS. 2 and 3, in accordance with the present invention.

DESCRIPTION OF THE PREFERRED EMBODIMENTS

Figure 1:
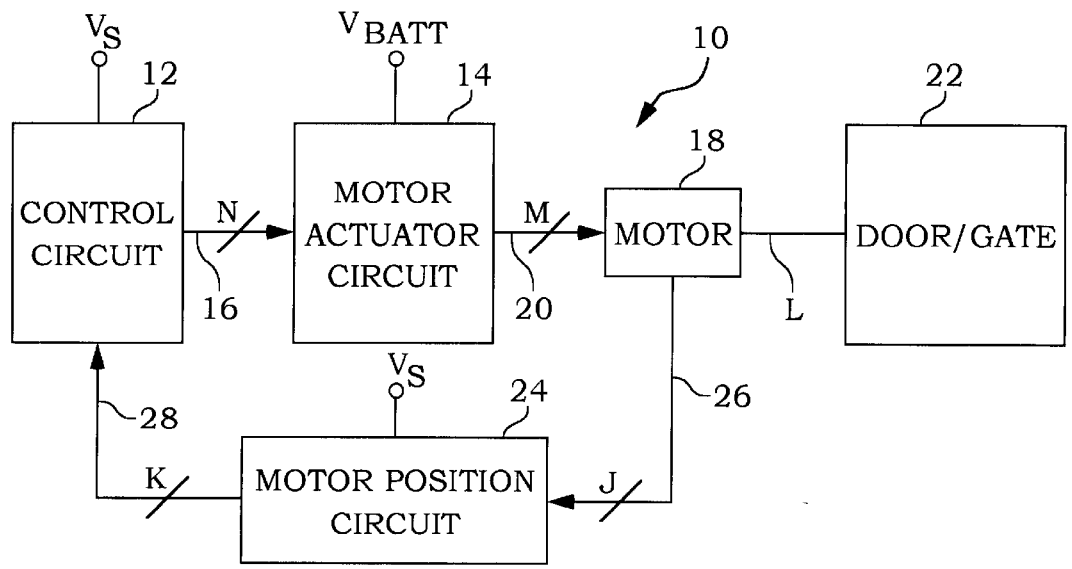
FIG. 1 is a diagrammatic illustration of a prior art power door or lift gate control system.
Figure 2:
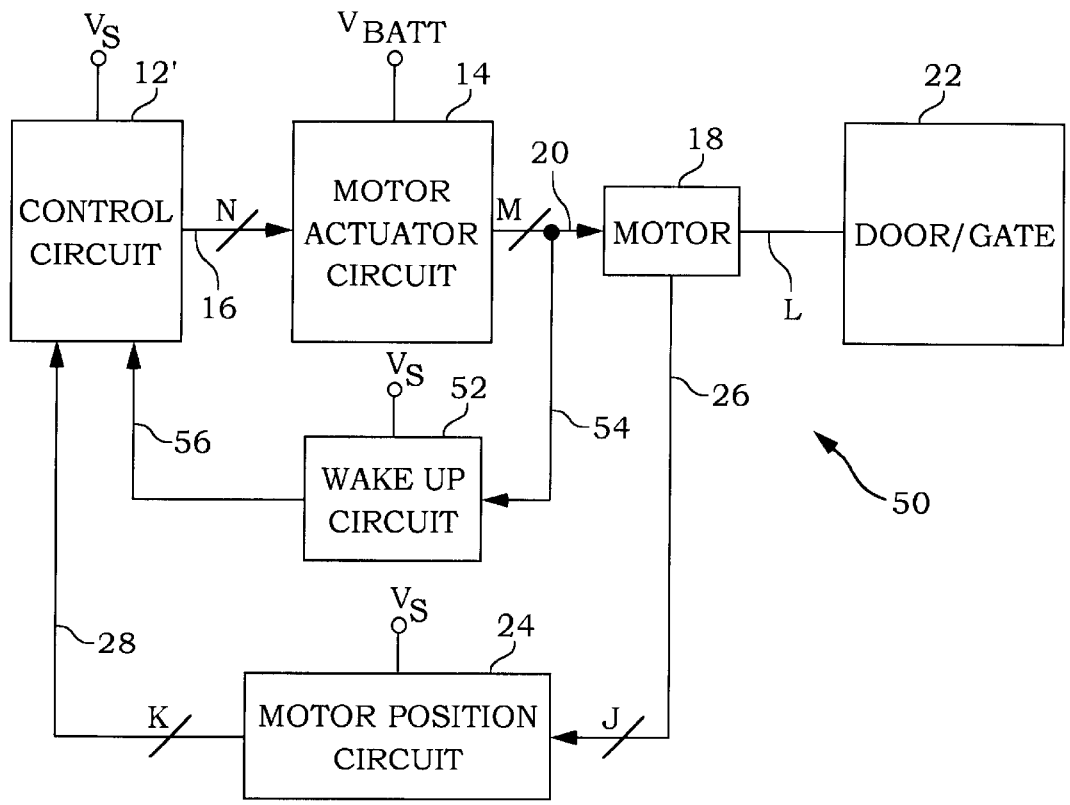
FIG. 2 is a diagrammatic illustration of a power door or lift gate control system in accordance with the present invention.

Referring now to FIG. 2, one preferred embodiment of a power door or lift gate control system 50, in accordance with the present invention, is shown. System 50 is identical in many respects to the system 10 illustrated in FIG. 1 and described hereinabove in the BACKGROUND section, and like components are therefore identified with like reference numbers. In particular, system 50 includes a motor actuation circuit 14 of known construction that is electrically connected to a control circuit 12' via a number, N, of signal paths 16, and to a motor 20 via a number, M, of signal paths 20, wherein N and M may be any positive integer. Motor 18 includes a drive shaft L that is mechanically coupled, to a door or lift gate 22, and that is electrically connected to a motor position circuit 24 of known construction via a number, J, of signal paths 26 wherein J may be any positive integer. Motor position circuit 24 is, in turn, electrically connected to control circuit 12' via a number, K, of signal paths wherein K may be any positive integer.

In one embodiment, motor 18 is preferably a known DC motor having a drive shaft L that is mechanically coupled directly to the door/gate 22, and that is responsive to one or more motor drive signals on signal paths 20 to actuate door/gate 22. The present invention contemplates using additional or other known types of motors, but wherein any such additional or alternate motors are so-called "direct drive" motors in that the motor drive shafts are mechanically coupled directly to the door/gate 22 either via drive shaft L or via mechanical linkage therebetween. In one embodiment, door/gate 22 is a sliding door located on either side of a motor vehicle such as a minivan. Alternatively, door/gate 22 is a lift gate located at the rear of a motor vehicle such as a sport utility vehicle (SUV). Alternatively still, door/gate 22 may be any door, gate, hatch or similar structure associated with a motor vehicle, building, or the like. In any case, motor actuation circuit 14 is responsive to one or more motor control signals on signal paths 16 to produce one or more corresponding motor drive signals on signal paths 20, wherein motor 18 is responsive to the one or more motor drive signals on signal paths 20 to actuate door/gate 22 between open and closed positions. Motor position circuit 24 preferably includes one or more motor position sensors producing corresponding motor position signals on signal path 26, wherein circuit 24 is operable in a conventional manner to provide one or more signals to control circuit 12' on signal paths 28 indicative of motor position. Control circuit 12' is responsive to the door/gate position signals produced by circuit 24 and also to an automatic door/gate actuation request, such as an electronic request via one or more wired switches or via a wireless source (e.g., remote control unit), or such as a mechanical request via, for example, manual door/gate actuation, to produce one or more motor control signals on signal path indicative of desired door/gate movement.

Like the control circuit 12 of FIG. 1, control circuit 12' is preferably microprocessor-based and includes a memory unit having stored therein a software control algorithm for controlling door/gate movement, wherein circuit 12' is operable to execute such an algorithm to thereby automatically control movement of door/gate 22. Unlike the control circuit 12 of FIG. 1, however, control circuit 12' preferably includes a conventional power-conserving, reduced function sleep-mode software algorithm, wherein circuit 12' is operable to execute such an algorithm to at least temporarily disable some of the functions of system 50 after some predefined time period has elapsed since the most recent movement of door/gate 22 to thereby reduce electrical power/current usage and therefore conserve electrical power. In this embodiment, the sleep-mode algorithm is preferably responsive to a wake up signal to restore full electrical power, and therefore full functional capabilities, to system 50. Unlike system 10 of FIG. 1, system 50 accordingly includes a wake up circuit 52 having an input electrically connected to one or more of the motor inputs via signal path 54, and an output electrically connected to an input of control circuit 12' via signal path 56. In accordance with the present invention, movement of the motor drive shaft L in the absence of a motor drive signal on any one of the signal paths 20 produces a back electromotive force (EMF) signal at one or more of the electrical inputs of motor 18, and therefore on one or more of the signal paths 20. It has been determined through experimentation that the back EMF signal produced by motor 18 in response to manual movement of motor drive shaft L ranges between 30 mV and several volts, depending upon the corresponding force impressed upon the door/gate 22. Wake up circuit 52 is accordingly responsive to the back EMF signal on any one of the signal paths 20 to produce a corresponding wake up signal on signal path 56. If control circuit 12' is operating in an electrical power conserving sleep mode, control circuit 12' is responsive to the wake up signal produced by wake up circuit 52 to restore full electrical power and system functionality to system 50. This arrangement allows the system 50 to conserve electrical power during sleep mode, yet maintain door/gate position by waking up system 50 to full functional operation upon detection of any manual actuation of door/gate 22.

Referring now to FIG. 3, system 50 of FIG. 2 is shown illustrating some of detailed features of one embodiment of the motor actuator circuit 14. In this embodiment, one electrical input of motor 18 is shown connected to a switch 62 of a first relay 60 via signal path $20_1$, wherein relay 60 has a first switch position (NORM OPEN) connected to battery voltage $V_{BATT}$ and a second switch position (NORM CLOSED) connected to ground potential. Another electrical input of motor 18 is shown connected to a switch 66 of a second relay 64 via signal path $20_2$, wherein relay 64 has a first switch position (NORM OPEN) that is unconnected and a second switch position (NORM CLOSED) connected to a drain of a field effect transistor 68 having a source connected to ground potential. The gate of transistor 68 is connected to one output of control circuit 12' via signal path $16_3$, and control inputs of switches 62 and 66 are connected to two additional outputs of control circuit 12' via signal paths $16_1$, and $16_2$ respectively. One electrical input of motor 18; e.g., signal path $20_2$ is connected to wake up circuit 52 via signal path 54, and the output of wake up circuit 52 is connected to an input of control circuit 12'.

In operation, control circuit 12' is operable to control the states of switches 62 and 66, as well as the gate of transistor 68, in a known manner to effectuate desired control of motor 18. When control circuit 12' is operating in sleep mode, switch 66 is preferably positioned in the NORM OPEN position while switch 62 may be positioned in either the NORM OPEN or NORM CLOSED position. With this switch configuration, motor 18 is responsive to manual rotation of the motor drive shaft L to produce a back EMF signal on signal path $20_2$, wherein wake up circuit is responsive to the back EMF signal to produce a wake up signal on signal path 56.

Referring now to FIG. 4A, a device-level schematic of one preferred embodiment 80 of wake up circuit 52, in accordance with the present invention, is shown. Circuit 80 includes a resistor R1 having one end connected to signal path 54 (i.e., to the input of wake up circuit 52) and an opposite end connected to one end of a second resistor R2 and to the base of an NPN transistor 82. The opposite end of R2 is connected to the emitter of transistor 82 and to ground potential, and the collector of transistor 82 is connected to one end of a third resistor R3. The opposite end of R3 is connected to a voltage supply $V_S$, and the collector of transistor 82 defines the output of wake up circuit 52. In an alternative embodiment, transistor 82 may be configured as a two-transistor pair arranged in a known Darlington configuration. In either case, circuit 80 is responsive to a back EMF signal on signal path 54 to turn on transistor 82 and thereby pull the normally logic high level collector to a logic low level near ground potential. Those skilled in the art will recognize that NPN transistor 82 may alternatively be replaced by a PNP transistor, metal-oxide-semiconductor field effect transistor (MOSFET), junction field effect transistor (JFET), insulated gate bipolar transistor (IGBT) or other known switching device, wherein modifications to circuit 80 to accommodate such alternative switching device structures are well within the knowledge of a skilled artisan. In any case, alternative switching device structures of the foregoing type are intended to fall within the scope of the present invention.

Referring now to FIG. 4B, a schematic of another embodiment 84 of the wake up circuit 52, in accordance with the present invention, is shown. In this embodiment, an inverting input of a comparator 86 is connected to a reference voltage VREF, and the input of wake up circuit 52 is defined by the non-inverting input of comparator 86. The output of comparator 86 defines the output of wake up circuit 52, wherein comparator 86 is responsive to the back EMF signal on signal path 54 to change the state of its output if the back EMF signal rises above VREF. This alternate structure for wake up circuit 52 is preferably used in applications where the back EMF signal produced by motor 18 may not be sufficient to forward bias and saturate the transistor 82 of FIG. 4A.

It should now be appreciated that the present invention is directed to a system for controlling the operation of at least one DC motor directly coupled to a door, lift gate or similar structure, wherein the system is preferably operable in a sleep mode after expiration of a predefined time period following the most recent controlled actuation of the door, lift gate or similar structure to thereby conserve electrical power and accordingly minimize power dissipation by the system. In accordance with the present invention, a wake up circuit is electrically connected to at least one of the electrical inputs of the motor such that when the system is operating in sleep mode, manual movement of the motor drive shaft produces a back EMF signal at the at least one electrical input that is detectable by the wake up circuit. The wake up circuit is responsive to the detected back EMF signal to produce a wake up signal, wherein the system is responsive to the wake up signal to restore full electrical power and full system functionality without losing motor drive shaft position.

While the invention has been illustrated and described in detail in the foregoing drawings and description, the same is to be considered as illustrative and not restrictive in character, it being understood that only the preferred embodiments have been shown and described and that all changes and modifications that come within the spirit of the invention are desired to be protected. For example, the motor actuation circuit shown and described with respect to FIG. 3 is provided only by way of example in order to demonstrate one application of the present invention. Those skilled in the art will recognize that the concepts of the present invention apply equally to other motor actuation circuit embodiments, and that such other motor actuation circuit embodiments are accordingly intended to fall within the scope of the present invention.

What is claimed is:

1. Circuitry for producing a wakeup signal based on back electromotive force (EMF) of a motor, comprising:

a motor having a drive shaft and at least one input for receiving a motor drive signal, said motor responsive to said motor drive signal to rotate said drive shaft, said motor producing a back EMF signal at said at least one input in the absence of said motor drive signal and in response to rotational movement of said drive shaft; and a wakeup circuit having an input connected to said at least one input of said motor and an output, said wakeup circuit responsive to said back EMF signal at said input thereof to produce a wakeup signal at said output thereof.

2. The circuitry of claim 1 further including a motor actuator circuit responsive to at least one control signal to produce said at motor drive signal.

3. The circuitry of claim 2 further including a control circuit producing said at least one control signal.

4. The circuitry of claim 3 wherein said control circuit is operable in a sleep mode to conserve electrical power and in a wake up mode to produce said control signal, said control circuit responsive to said wake up signal to operate in said wake up mode.

5. The circuitry of claim 4 further including one of a door and a lift gate mechanically coupled to said drive shaft, said motor responsive to said drive signal to actuate said one of a door and a lift gate via rotation of said drive shaft.

6. The circuitry of claim 5 wherein said motor is responsive to movement of said one of a door and a lift gate in the absence of said motor drive signal to produce said back EMF signal at said at least one input of said motor.

7. The circuitry of claim 1 further including a control circuit producing said motor drive signal, said control circuit operable in a sleep mode to conserve electrical power and in a wake up mode to produce said control signal, said control circuit responsive to said wake up signal to operate in said wake up mode.

8. The circuitry of claim 1 further including one of a door and a lift gate mechanically coupled to said drive shaft, said motor responsive to said drive signal to actuate said one of a door and a lift gate via rotation of said drive shaft.

9. The circuitry of claim 8 wherein said motor is responsive to movement of said one of a door and a lift gate in the absence of said motor drive signal to produce said back EMF signal at said at least one input of said motor.

10. The circuitry of claim 1 further including one of a door and a lift gate mechanically coupled to said drive shaft, said motor responsive to movement of said one of a door and a lift gate in the absence of said motor drive signal to produce said back EMF signal at said at least one input of said motor.

11. The circuitry of claim 1 wherein said wakeup circuit includes at least one switching device having said output coupled to a source voltage, said at least one switching device responsive to said back EMF signal to pull said output to near a reference potential, said switching device otherwise forcing said output to a potential near said source voltage.

12. The circuitry of claim 1 wherein said wakeup circuit includes a comparator having a first input connected to said at least one input of said motor and a second input receiving a reference voltage, said comparator producing said wakeup signal when said back EMF signal exceeds said reference voltage.

13. A method for producing a wakeup signal in a motor control system based on back electromotive force (EMF) of an electrically driven motor, the method comprising the steps of:

monitoring an electrical input of a motor having a drive shaft wherein said motor is responsive to a motor drive signal to rotate said drive shaft, said motor producing a back EMF signal in response to movement of said drive shaft in the absence of said motor drive signal; and producing a wakeup signal is response to detection of said back EMF signal.

14. The method of claim 13 further including the step of switching a motor control system including the motor from an electrical power conserving sleep mode of operation to a full power wakeup mode of operation in response to said wakeup signal.

15. The method of claim 13 further including the step of producing said motor drive signal in response to a control signal.

16. The method of claim 15 further including the steps of:

providing a control circuit for producing said control signal, said control circuit operable in a reduced function sleep mode of operation to conserve electrical power and in a full function wakeup mode of operation to produce said control signal; and causing said control circuit to operate in said wakeup mode of operation in response to said wakeup signal.

17. The method of claim 13 further including the step of driving one of a door and a lift gate via rotation of said motor drive shaft.

18. The method of claim 17 further including the step of producing said back EMF signal in response to movement of said one of a door and a lift gate in the absence of said motor drive signal.

* * * * *